May 1, 1962  D. E. WIEGAND  3,031,846
HYDRAULIC SERVO
Filed April 5, 1961  2 Sheets-Sheet 1
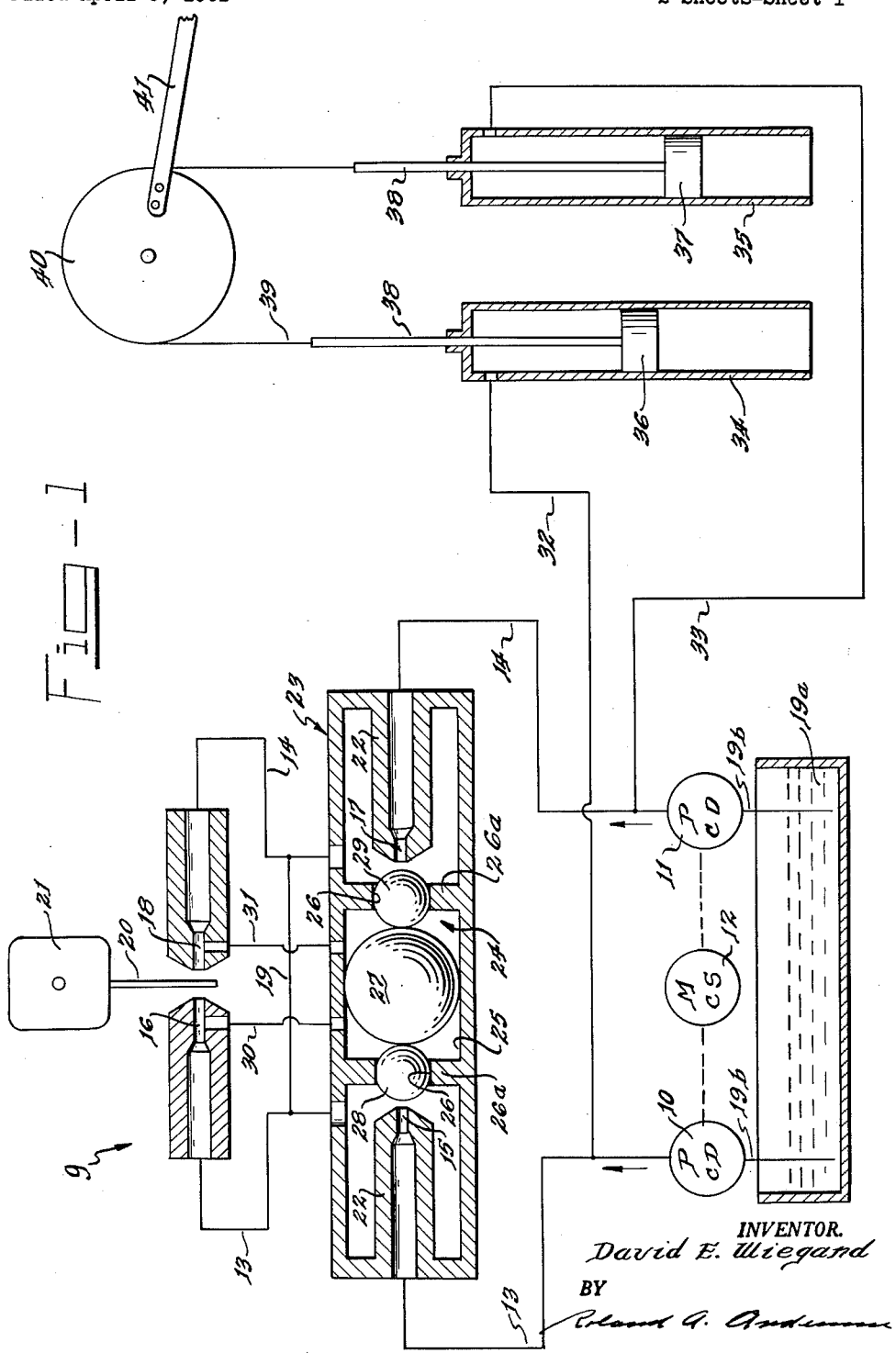
INVENTOR.
David E. Wiegand
BY
Roland G. Anderson
Attorney May 1, 1962  D. E. WIEGAND  3,031,846
HYDRAULIC SERVO
Filed April 5, 1961  2 Sheets-Sheet 2
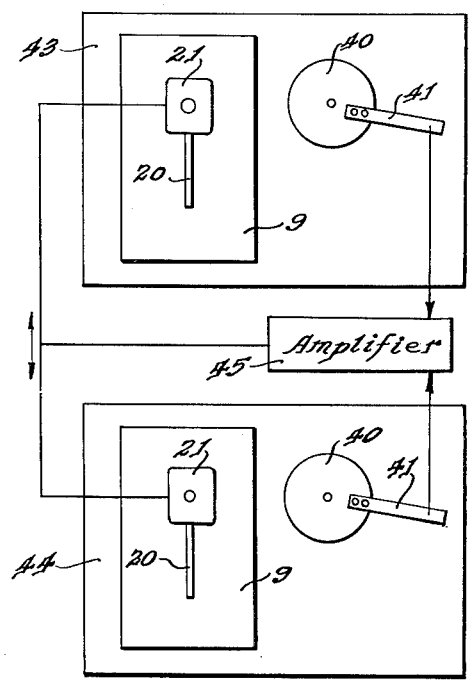
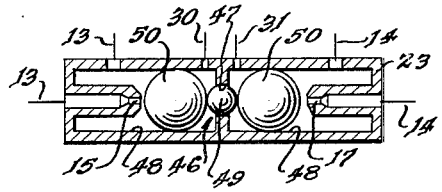
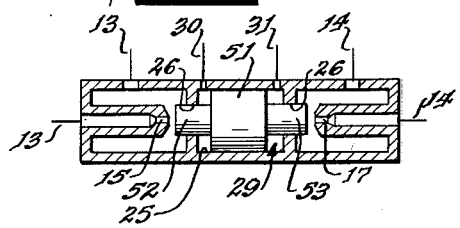
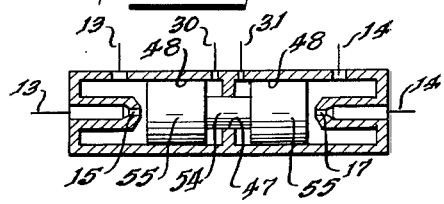
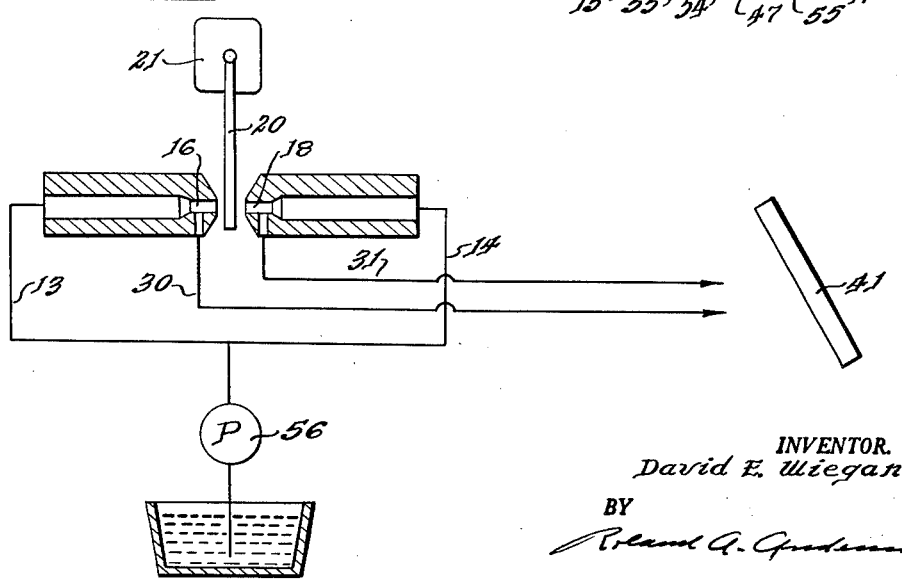
INVENTOR.
David E. Wiegand
BY
Roland A. Anderson
Attorney United States Patent Office 3,031,846
Patented May 1, 1962

3,031,846
HYDRAULIC SERVO
David E. Wiegand, Villa Park, Ill., assignor to the United States of America as represented by the United States Atomic Energy Commission
Filed Apr. 5, 1961, Ser. No. 101,028
7 Claims. (Cl. 60—52)

This invention relates to an hydraulic servo and, more specifically, to one in which a small hydraulic force difference produced by a small electrical device is hydraulically amplified for acting against an external mechanical load.

An important advantage in an hydraulic servo for converting a weak electrical signal to a large force is a significant reduction in inertia of driving members needed in other mechanical servos. Hydraulic servos operating at a variable flow rate have the disadvantage of needing flow-responsive valves and variable-flow pumps. Such servos may have no flow or very little flow when no signal is received, and thus may easily clog with impurities after relatively short use. Servicing may be frequently required and will be very difficult and time-consuming if the servos are used in a remote-control manipulator. Hydraulic servos operating at a constant flow rate, on the other hand, can be made self-cleaning with a relatively high flow rate and need only constant-flow pumps, which are low in cost and simple in construction.

An object of the present invention is to provide an hydraulic servo operating at a constant flow rate.

A further object is to provide an hydraulic servo requiring little servicing because of its self-cleaning qualities.

Another object is to provide a valve for an hydraulic servo tolerating dirt and impurities to a relatively high degree.

Other objects will appear from the disclosure.

Hydraulic servos of the present invention may be used in a manipulator of the type disclosed and claimed in Goertz et al. Patent 2,846,084, dated August 5, 1958. The manipulator of this patent comprises a master unit, a slave unit, and electrical systems connected therebetween for transmitting seven types of movement of the master unit to the slave unit. In the Goertz et al. patent, an electrical signal received from the master unit for a certain type of movement thereof is greatly amplified and fed to a large motor on the slave unit to produce the certain type of movement in the slave unit. In the hydraulic servo of the present invention, a small torque motor is operated by an electric signal to produce a small pressure difference in a constantly flowing hydraulic loop, and this pressure difference is hydraulically amplified to produce the movement in question.

In the drawings:

FIG. 1 is a schematic view of the hydraulic servo of the present invention employing balls;

FIG. 2 is a schematic view illustrating the use of the hydraulic servo;

FIG. 3 shows schematically another form of the servo using balls;

FIG. 4 shows schematically a form using cylindrical pistons;

FIG. 5 shows schematically a further form using a different arrangement of cylindrical pistons; and FIG. 6 shows schematically a less complicated form of the servo.

As shown in FIG. 1, the reference character 9 designates the present servo, which include two positive-displacement pumps 10 and 11 driven at constant speed by a motor 12 so as to operate at constant flow. The lines 13 and 14 are connected to the pressure sides of the pumps 10 and 11, respectively, so as to receive therefrom a suitable hydraulic fluid such as oil, under pressure.

The line 13 has formed therein an orifice 15 and also an orifice 16, which is beyond the orifice 15 on the pressure side of the pump 10. The line 14 has formed therein an orifice 17 and also an orifice 18, which is beyond the orifice 17 on the pressure side of the pump 11. The lines 13 and 14 are interconnected as shown at 19 so that the pressures just below the orifices 15 and 17 are equal and the pressures just above the orifices 16 and 18 are equal. The fluid coming out of the orifices 16 and 18 is returned by means (not shown) to a sump 19a, from which the fluid is sucked through intake lines 19b by the pumps 10 and 11.

The torque motor 21 acts against the flapper arm 20 with a force proportional to the signal applied to the torque motor in a direction depending on the algebraic sign of the signal. Spring means (not shown) act against the flapper arm 20 so that it is centered between the orifices 16 and 18 when no signal is applied to the torque motor, and moves toward the orifice 16 or 18 a distance determined by the strength of the signal against the spring means and against the hydraulic forces developed.

The valve body 23 has a chamber 24 formed of a central cylindrical opening 25 of relatively large diameter and two cylindrical end openings 26 of the same relatively small diameter generally coaxial therewith and formed in internal walls 26a of the valve body 23. A central piston in the form of a relatively large spherical ball 27 fits the opening 25, and end pistons in the form of two relatively small spherical balls 28 and 29 fit the openings 26 and engage opposite sides of the ball 27. The central opening 25 is of larger diameter than the end openings 26. The central ball 27 is of larger diameter than the end balls 28 and 29. The balls 28 and 29 control the orifices 15 and 17, respectively. The balls 27, 28, and 29 stay in contact with one another, as will be explained presently, and constitute a piston means. The internal projections 22 of the valve body 23 and the portions thereof outward of the walls 26a form parts of the lines 13 and 14. The pressures in the orifices 16 and 18 are transmitted by lines 30 and 31 to regions of the chamber 24 at opposite sides of the large ball 27.

Lines 32 and 33 lead from lines 13 and 14, respectively, at regions between the pumps 10 and 11 and orifices 15 and 17, to hydraulic cylinders 34 and 35, in which movable pistons 36 and 37 are positioned, respectively. The pistons are connected by rods 38 to the ends of a cable or tape 39 extending about a pulley or drum 40. An arm 41 or motion-producing element 41 is secured to the drum 40.

When the torque motor 21 receives no electrical signal, the flapper arm 20 is positioned midway between the orifices 16 and 18, so that the pressures therein are equal. Thus, the pressures in the chamber 24 are equal at both sides of the large ball 27. Because of the interconnection of the lines 13 and 14 at 19, the pressures at the outer sides of the small balls 28 and 29 are equal. Since the pressure on the outer sides of the balls 28 and 29 is slightly greater than the pressure just above the orifices 16 and 18, which is greater than that within these orifices, and since the pressure on the inner sides of the balls 28 and 29 is the same as that within the orifices 16 and 18, there is greater pressure on the outer sides of the balls 28 and 29 than on the inner sides thereof, and so the balls 28 and 29 stay in contact with ball 27. Since, with the flapper arm 20 centrally positioned, the pressures on both sides of the ball 27 and on the inner sides of balls 28 and 29 are equal, and the pumps 10 and 11 are operating at equal flow rates, the balls occupy a central position and the balls 28 and 29 are equally spaced from the orifices 15 and 17. Thus equal pressures exist in the lines 13 and 14 between the orifices 15 and 17 and the pumps 10 and 11, in the lines 32 and 33, and in the cylinders 34 and 35. Consequently, the arm 41 does not move.

When torque motor 21 receives an electrical signal, the flapper arm 20 moves in one direction or the other toward the orifice 16 or 18. Assume the arm 20 moves toward the orifice 16 and thus restricts it. Consequently, the fluid velocity in the orifice 16 becomes less than that in the orifice 18, and the pressure in orifice 16 becomes greater than that in orifice 18. As a result, the pressure in chamber 24 to the left of ball 27 becomes greater than that to the right, and the balls 27, 28, and 29 move to the right, decreasing the size of the orifice 17 and increasing the size of the orifice 15. Thus less fluid will flow in line 14 and more in line 13, and since the flow from pumps 10 and 11 remains constant, fluid must flow in line 33 to the cylinder 35 and in line 32 away from cylinder 34. Consequently, the arm 41 moves clockwise. When the ball 29 moves toward orifice 17, the ball 28 moves away from orifice 15, thus reducing the restriction to flow of fluid therethrough. This facilitates the flow of fluid in line 32 from the cylinder 34 to the line 13, for now the orifice 15 must handle the flow both of pump 10 and line 32. When flapper arm 20 takes up a position closer to orifice 18 than to orifice 16, the arm 41 moves counterclockwise.

The total force exerted by the balls 27, 28, and 29 in moving to the right or to the left from the central position shown in FIG. 1 is equal to the difference in pressure in the chamber 24 between one side of the ball 27 and the other times the difference between the diametral areas of the ball 27 and the ball 28 or 29. The difference in these diametral areas must be sufficient that a satisfactory force multiplication occurs. Yet the difference should not be so great that the shift in the balls 27, 28, and 29 takes place too slowly because of the large volume of fluid to be moved in and out of the chamber 24.

The distance moved by the balls 27, 28, and 29 toward the orifice 15 or 17 depends upon the difference in pressure in the orifices 16 and 18, for as the ball 28 or 29 approaches the orifice 15 or 17, restriction of the orifice results in increased pressure therein. Thus the balls 27, 28, and 29 stop when the force of the fluid exiting from the orifice 15 or 17 balances the net force acting on the balls.

The total quantity of fluid flowing per unit time remains constant, being the sum of the constant flow rates of the two pumps 10 and 11. When there is no signal to make the torque motor 21 shift the flapper arm 20 from its mid position between the orifices 16 and 18, the flow rate through these orifices and orifices 15 and 17 is the same. When the flapper arm 20 is out of its mid position, the flow rate through orifice 17, for example, decreases and that through orifice 15 increases. In any event, the average flow rate is high, so that at all times the system is flushed with fluid and the possibility that dirt particles will become lodged in critical regions is much less with this system using constant flow than with a system allowing stagnant fluid in certain passages in the absence of an input signal. It is true, however, that at certain moments the flow rate through a given orifice is zero, because the flapper arm has moved far enough to block completely the orifice 16 or 18, and consequently the ball 29 or 28 may completely block the orifice 17 or 15. This condition can last only a short time, because the motion-producing element 41 needs only a short time to go at full speed from one extreme position to the other. The operation of the flapper arm 20, balls 27, 28, and 29, and orifices 15, 16, 17, and 18 as valves is far superior to that of valves operating at constant pressure.

Flows are disturbed from their balanced condition if and only if the element 41 moves. Input signals, with resulting motion of the flapper arm 20 and the balls 27, 28, and 29, result in forces applied to the element 41 which forces may or may not cause motion of the element 41 and consequent flow imbalances. Thus, if the element 41 is blocked against movement, there is no flow in lines 32 and 33. Consequently, the entire and equal flows of the pumps 10 and 11 go through the orifices 15 and 17, in spite of the fact that one of these orifices may be fairly blocked by the ball 28 or 29. This can occur, because the one pump develops more head than the other pump for the same flow.

Since the balls 27, 28, and 29 are not connected with one another, the openings 25 and 26 need be only in rough axial alignment and need not be lapped to have an accurate fit with the balls. The balls 27, 28, and 29, being unconnected, can roll in the openings 25 and 26, and so the friction between the balls and openings is low. Thus, the cost and trouble of preparing the openings 25 and 26 for the balls 27, 28, and 29 are lower than for a single piston having three connected sections fitting the openings 25 and 26. Moreover, the balls operate relatively well in dirty hydraulic fluid.

Since the orifices 15, 16, 17, and 18 remain open when no signal is applied to the torque motor 21, the element 41 can be easily moved by an operator directly independently of the torque motor 21.

As shown in FIG. 2, two hydraulic servos 9 described are used in the manipulator of the aforementioned Goertz et al. Patent 2,846,084 for each of the seven motions accommodated by this manipulator, one servo on a master unit 43 and the other on a slave unit 44. The motion-producing elements 41 are connected to an amplifier 45, which produces an electric signal when the element 41 on the master unit 43 is moved out of position correspondence with the element 41 on the slave unit 44. The signal so produced is transmitted to the two torque motors 21 on the master and slave units. The action of the signal on the torque motor 21 on the slave unit 44 is to move the flapper arm 20 in the direction required for the balls 28 and 29 acting on orifices 15 and 17 to move the element 41 on the slave unit 44 into position correspondence with that on the master unit. The action of the signal on the torque motor 21 on the master unit 43 is the opposite and moves the flapper arm 20 of the master unit in the opposite direction to that moved in by the flapper arm 20 on the slave unit. Consequently, the balls 28 and 29 move in such a direction with respect to the orifices 15 and 17 as to provide a resistance to further movement of the element 41 on the master unit 43, or a "sense of feel." It is to be understood that the master servo 9 is not necessarily identical in size with the slave servo 9 for the same motion of the manipulator, because, as disclosed in the aforesaid Goertz et al. patent, the force exerted by the slave unit 44 may be greater than that exerted on the master unit 43 by the operator, for example, 100 lbs. as against 25 lbs. Thus the orifices 16 and 18 on the master unit 43 may be larger than orifices 16 and 18 on the slave unit 44, so that a smaller net pressure is exerted on the balls 27, 28, and 29 on the master unit, resulting in a lowered "sense of feel" on the master unit. The same result can be reached by operating the pumps 10 and 11 on the master unit at a lower constant rate than the pumps 10 and 11 on the slave unit.

In the modification of FIG. 3, the valve body 23 has a chamber 46 formed by a central opening 47 of small diameter and end openings 48 of the same large diameter generally coaxial therewith. A central piston in the form of a relatively small spherical ball 49 fits the small central opening 47, and end pistons in the form of two relatively large spherical balls 50 fit the large end openings 48 and engage opposite sides of the ball 49. In operation, for a movement of the flapper arm 20 in a given direction away from its central position, the balls 49 and 50 will move in the opposite direction to that moved by the pistons 27, 28, and 29 of FIG. 1. Thus, the element 41 when controlled by balls 49 and 50 will be moved in the opposite direction to that in which the element 41 will be moved when controlled by the balls 27, 28, and 29 of FIG. 1, unless the lines 32 and 33 are switched in their connections to cylinders 34 and 35 or the lines 30 and 31 are switched in their connections to orifices 16 and 18. The modification of FIG. 3 has the advantage that the construction of the valve body 23 and assembly of balls 49 and 50 with the valve body are simplified, since the small ball 49 is at the center. The modification of FIG. 1 has the advantage that the material and weight of balls 27, 28, and 29 are less, since there is only a single large ball 27.

In the modification of FIG. 4, the pistons take the form of three unconnected cylinders, rather than three unconnected balls. Thus a large central cylinder 51 fits the central opening 25 of chamber 24, and two small end cylinders 52 and 53 fit the end openings 26, engage the ends of the large cylinder 51, and control the orifices 15 and 17, respectively. Since the cylinders 51, 52, and 53 are not connected with one another, the openings 25 and 26 need be only in rough axial alignment and need not be lapped to have an accurate fit. The cylinders 51, 52, and 53 do not have the advantage of rolling in the openings 25 and 26 as do the balls 27, 28, and 29, but do have the advantage of not wedging against foreign matter in the openings 25 or 26, as the balls 27, 28, and 29 might.

In the modification of FIG. 5, the pistons are three unconnected cylinders, namely, a small central cylinder 54 and two large end cylinders 55 engaging the central cylinder 54. The small central cylinder 54 fits the small central opening 47, and the large end cylinders 55 fit the large end openings 48.

It will be understood that balls and cylinders may be used with one another. Thus, for example, two end balls may be used with a central cylinder; two end cylinders may be used with a central ball; and end pistons at the same time may be a ball and a cylinder, the central member being a ball or a cylinder. The requirement, in any event, is that the end pistons have the same diameter as one another and a different diameter from the central piston. Moreover, each of the central and end pistons may be formed of a plurality of parts.

The modification of FIG. 6 exemplifies the aspect of the present invention having to do with the utilization of pressures at the orifices against which control means act. Thus, as in FIG. 1, a flapper arm 20, actuated by a torque motor, moves in one direction or the other from its central position between orifices 16 and 18 in lines 13 and 14, in order to vary the flow through orifices 16 and 18 in accordance with signals impressed on the torque motor 21. The lines 13 and 14 are supplied by a pump 56, which operates at constant flow or at constant pressure, but preferably the former. The different pressures in orifices 16 and 18 occurring as a result of the movement of the flapper arm 20 out of its central position are transmitted through lines 30 and 31 to act against the motion-producing element 41, either directly or through some servo independent of the hydraulic system of the pump 56 and lines 13 and 14. The use of the unequal pressures existing right in the orifices 16 and 18 rather than at some other regions eliminates the need for external orifices with their attendant power loss.

The intention is to limit the invention only within the scope of the appended claims.

What is claimed is:

1. An apparatus comprising two constant-flow pumps, two lines leading from the pumps at their pressure sides, means forming first orifices in the lines, means forming second orifices in the lines farther from the pump than the first orifices, means acting against the second orifices to vary the flow therethrough, means forming a cylindrical chamber, piston means fitting the chamber, the first orifices in the lines being adjacent the ends of the piston means so as to be controlled thereby, means connecting the second orifices with regions of the chamber at opposed portions of the piston means to transmit the pressure in one second orifice in one direction against the piston means and pressure in the other second orifice in the opposite direction against the piston means, means interconnecting the lines between the first and second orifices to assure equality of high pressures above the second orifices and below the first orifices and against the ends of the piston means at the outside of the chamber, and means for transmitting to a load the pressures in the lines between the pumps and the first orifices.

2. An apparatus comprising two constant-flow pumps, two lines leading from the pumps at their pressure sides, means forming first orifices in the lines, means forming second orifices in the lines farther from the pumps than the first orifices, control means acting against the second orifices to vary the flow therethrough, a valve body having a chamber formed of a central cylindrical opening and two cylindrical end openings of the same diameter as one another and of different diameter from the central opening, the end openings being generally aligned with the central opening and directly adjacent to the same opposite ends thereof, a central piston fitting the central opening, two end pistons fitting the end openings and engaging the central piston, the end pistons being of the same diameter as one another and of a diameter different from that of the central pistons, the pistons being free of connection with one another, means for transmitting low pressures in the second orifices to opposite sides of the central piston and the inner sides of the end pistons, the first orifices in the lines facing one another and being adjacent to the end pistons so as to be controlled thereby, means interconnecting the lines between the first and second orifices to assure equality of high pressures above the second orifices and of high pressures below the first orifices and at the outer sides of the end pistons, and means for transmitting to opposite sides of a load the pressures in the lines between the pumps and the first orifices.

3. The apparatus specified in claim 2, the central piston being a relatively large spherical ball, the end pistons being relatively small spherical balls smaller than the large ball.

4. The apparatus specified in claim 2, the central piston being a relatively small spherical ball, the end pistons being relatively large spherical balls larger than the small ball.

5. The apparatus specified in claim 2, the central piston being cylindrical and relatively large in diameter, the end pistons being cylindrical and smaller in diameter than the central piston.

6. The apparatus specified in claim 2, the central piston being cylindrical and relatively small in diameter, the end pistons being cylindrical and larger in diameter than the central piston.

7. The apparatus specified in claim 2, the second orifices being closely spaced and facing one another, the control means being a flapper arm moving in the space between the second orifices in order to control them.

References Cited in the file of this patent

UNITED STATES PATENTS

| 2,356,597 | Kronenberger | Aug. 22, 1944 |
| 2,669,247 | Olah | Feb. 16, 1954 |
| 2,939,430 | Westbury | June 7, 1960 |

OTHER REFERENCES

Ser. No. 366,364, Wunsch et al. (A.P.C.), published Apr. 27, 1943.